(12) United States Patent
Schaller et al.

(10) Patent No.: US 11,498,441 B2
(45) Date of Patent: Nov. 15, 2022

(54) METHOD FOR POSITIONING A VEHICLE, CONTROL DEVICE OF THE VEHICLE, AND VEHICLE, AND METHOD FOR CONTROLLING AN INDUCTIVE CHARGING STATION, CONTROL DEVICE OF THE CHARGING STATION, AND CHARGING STATION

(71) Applicant: Robert Bosch GmbH, Stuttgart (DE)

(72) Inventors: Benedikt Schaller, Leonberg (DE); Christopher Bulla, Pforzheim (DE); Paul Mercea, Stuttgart (DE); Petko Faber, Renningen (DE); Tobias Kress, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 17/176,958

(22) Filed: Feb. 16, 2021

(65) Prior Publication Data

US 2021/0261011 A1 Aug. 26, 2021

(30) Foreign Application Priority Data

Feb. 21, 2020 (DE) .......................... 102020202253.4

(51) Int. Cl.
*B60L 53/37* (2019.01)
*B60L 53/36* (2019.01)
*B60L 53/38* (2019.01)

(52) U.S. Cl.
CPC ............... *B60L 53/37* (2019.02); *B60L 53/36* (2019.02); *B60L 53/38* (2019.02)

(58) Field of Classification Search
None
See application file for complete search history.

(56) References Cited

U.S. PATENT DOCUMENTS 10,766,375 B2 *  9/2020  Rompe ................... B60L 53/32
2016/0039541 A1 *  2/2016  Beardsley .............. G05D 1/042
                                                                701/2

FOREIGN PATENT DOCUMENTS

DE        102015215127 A1     2/2017

* cited by examiner

*Primary Examiner* — David V Henze-Gongola
(74) *Attorney, Agent, or Firm* — Norton Rose Fulbright US LLP; Gerard Messina

(57) ABSTRACT

A method for positioning a vehicle, having an inductive charging coil, at a stationary inductive charging station. The method includes: recognizing an operating state of the vehicle, and/or a state of the environment of the vehicle, based on an acquired first camera image; ascertaining a suitable illumination signal for at least one illumination device of a reference element of the inductive charging station based on the recognized operating state or environmental state; emitting a control signal to the inductive charging station based on the ascertained suitable illumination signal; recognizing the reference element based on an acquired second camera image and of the ascertained suitable illumination signal; determining a relative position and/or an orientation of the vehicle based on the recognized reference element in the second camera image; and controlling the vehicle based on the determined relative position and/or of the orientation.

10 Claims, 4 Drawing Sheets

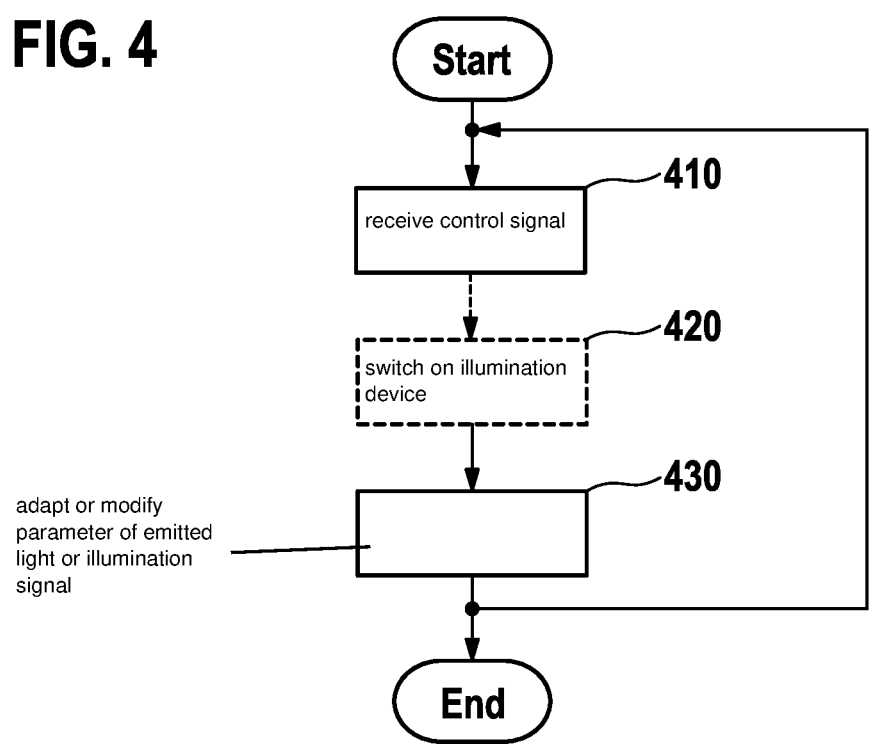

METHOD FOR POSITIONING A VEHICLE, CONTROL DEVICE OF THE VEHICLE, AND VEHICLE, AND METHOD FOR CONTROLLING AN INDUCTIVE CHARGING STATION, CONTROL DEVICE OF THE CHARGING STATION, AND CHARGING STATION

CROSS REFERENCE

The present application claims the benefit under 35 U.S.C. § 119 of German Patent Application No. DE 102020202253.4 filed on Feb. 21, 2020, which is expressly incorporated herein by reference in its entirety.

FIELD

The present invention relates to a method for positioning a vehicle, having an inductive charging coil, at a stationary inductive charging station, a control signal being transmitted to the inductive charging station as a function of an ascertained suitable illumination signal. The present invention also relates to a charging device for a vehicle, the charging device being configured to carry out the method according to the present invention. The present invention further relates to a vehicle having the control device according to the present invention.

The present invention furthermore relates to a method for controlling an inductive charging station and to a control device for an inductive charging station. The present invention further relates to an inductive charging station having the control device for the inductive charging station.

BACKGROUND INFORMATION

Manual guidance of a vehicle to an inductive charging station would in many cases not achieve the accuracy, to within centimeters, of the parked position of the vehicle which is necessary for desired efficient energy transfer. Automatic positioning of the vehicle is consequently useful for inductive charging of a vehicle at an inductive charging station. For automatic positioning of the vehicle with the requisite accuracy, however, a reference position of the vehicle with respect to the inductive charging station must be known, or ascertained or detected, with high accuracy. The tolerances or accuracy of satellite-assisted positional determination are not sufficient. Camera-based localization methods, for example, are therefore used.

An object of the present invention is to improve the automatic positioning of a vehicle at a stationary inductive charging station.

SUMMARY

The object may be achieved according to example embodiments of the present invention.

The present invention relates to a method for positioning a vehicle, having an inductive charging coil, at a stationary inductive charging station. The method encompasses a first acquisition of a first camera image, or a first sequence of first camera images, of an environment of the vehicle by way of a camera apparatus on the vehicle. The first acquisition of the first camera image can advantageously be carried out by way of a control device that receives a first electrical signal from the camera apparatus, the first electrical signal representing the first camera image. The camera apparatus can advantageously encompass at least one viewing direction, proceeding from the vehicle, toward the front in the travel direction of the vehicle, toward the rear, and/or to the side. At least one operating state of the vehicle and/or one state of the environment of the vehicle is then recognized as a function of the acquired first camera image or as a function of the first sequence of first camera images. What is recognized as an operating state or environmental state is, for example, a current dazzling of the camera apparatus by another light source in the first camera image, for example the sun or headlights of an oncoming other vehicle, and/or a plurality of other light sources in the environment imaged in the first camera image, and/or a current weather situation in the environment imaged in the first camera image, for example rain and/or wind. Alternatively or additionally, provision can be made to recognize image artifacts in the current first camera image and/or in the first sequence of first camera images, for example flicker artifacts, as an operating state or environmental state. Alternatively or additionally, provision can furthermore be made to ascertain a speed of the vehicle, for example as a function of an ascertained optical flow as a function of the first sequence of first camera images, as an operating state. A suitable illumination signal for at least one illumination means (device) of a reference element of the inductive charging station is then ascertained as a function of the at least one recognized operating state or environmental state, in particular by adapting a parameter of the illumination signal, the suitable illumination signal or the adapted parameter of the suitable illumination signal advantageously to be recognized, or to be ascertained and localized, in particularly simple fashion in a current camera image acquired by way of the camera apparatus, or in a sequence of camera images, of the environment. Preferably, what is ascertained or adapted as a parameter is a color differing from other light sources or an emission spectrum differing from other light sources, and/or a flashing characteristic of the illumination means constituting a suitable illumination signal; for example, a rapidly repeating red flashing light, or an illumination signal alternatingly flashing red and yellow for one second each, is ascertained as a suitable illumination signal. A list for ascertainment of the suitable illumination signal encompasses, in particular, the possible identifiers, using in shipping, of a navigational beacon. In other words, for example, an illumination signal or an identifier from a list of possible illumination signals is selected or ascertained as a suitable illumination signal as a function of the recognized operating state or environmental state, the suitable illumination signal or the ascertained parameter of the suitable illumination signal advantageously to be distinguished from other light sources, in particular those acquired in the first camera image, in the acquired environment. In a further method step, a control signal is emitted to the inductive charging station as a function of the suitable illumination signal, in particular by way of a radio signal that is advantageously emitted by way of a transmitting apparatus of the vehicle. In other words, the control signal emitted to the inductive charging station advantageously represents the ascertained suitable illumination signal. A second acquisition of a second camera image, or a second sequence of second camera images, of the environment of the vehicle is then carried out by way of the camera apparatus on the vehicle. The second acquisition of the second camera image can advantageously be carried out by way of the control device which receives a second electrical signal from the camera apparatus, the second electrical signal representing the second camera image. The second acquisition preferably occurs after a time span of the first acquisition has elapsed and/or after a time span of the emission of the control signal to the inductive charging station has elapsed, or occurs with an offset in time with respect to the first acquisition. In other words, a first location of the vehicle at which the first acquisition is carried out is distinguished from a second location of the vehicle at which the second acquisition is carried out, in particular because the vehicle can continue to move as the time span proceeds. Provision can also be made that the first and the second acquisition are carried out at the same location, or that the vehicle is not moved or does not travel from the first acquisition at least until the second acquisition. In a subsequent method step, the at least one reference element of the inductive charging station is recognized as a function of the acquired second camera image and of the ascertained suitable illumination signal. In other words, a search is preferably made in the second camera image, or in the second sequence of second camera images, for the ascertained suitable illumination signal, which advantageously is easy to recognize in the second camera image of the acquired environment because it clearly differs from other light sources, and the reference element is recognized in the second camera image based on the ascertained suitable illumination signal. The advantageous result is that the computation performance necessary for recognition of the suitable illumination signal of the reference element is reduced. Advantageously, at least two reference elements of the inductive charging station are recognized, different suitable illumination signals particularly preferably being ascertained for the at least one illumination means of the respective reference element, and the recognition of the respective reference element being accomplished based on the different respective ascertained suitable illumination signals and on the acquired second camera image. A relative position and/or an orientation of the vehicle with respect to the inductive charging station is then determined as a function of the at least one recognized reference element; in particular, a relative position and an alignment of the travel direction or of the orientation of the vehicle in space is determined. In a further step, the vehicle is controlled in a longitudinal and/or transverse direction as a function of the determined relative position and/or of the determined orientation of the vehicle with respect to the inductive charging station, control occurring in particular automatically and, advantageously, by application of control to a steering motor and to a drive motor. The vehicle is preferably controlled in a longitudinal and/or transverse direction additionally as a function of detected odometry data of the vehicle, for example as a function of a detected rotation speed of a wheel or a detected speed of the vehicle and/or as a function of a detected steering angle of the vehicle. The advantage resulting from the method is that the reference element of the inductive charging station, or the relative position of the vehicle with respect to the inductive charging station, can be ascertained accurately, quickly, and reliably in a variety of weather conditions or visibility conditions. Execution of the method can advantageously be repeated once, several times, or continuously, on the one hand in order to improve accuracy and on the other hand in order to react to changing environmental conditions.

In a preferred embodiment of the present invention, the suitable illumination signal is ascertained by adaptation of or selection from at least one of the parameters below. The suitable illumination signal encompasses as a parameter a position of the reference element on the inductive charging station and/or a brightness of the illumination means and/or a color or an emitted emission spectrum of the illumination means and/or a flashing characteristic of the illumination means and/or a polarization of the light to be emitted by the illumination means. As a result of the ascertainment or adaptation of the position of the reference element and/or of the brightness and/or of the color or emission spectrum and/or of the flashing characteristic and/or the polarization, the ascertained illumination signal is advantageously configured to be easily distinguished from other light sources or ascertained in the second camera image. Subsequent recognition of the reference element based on the suitable illumination signal and on the second camera image thus advantageously proceeds very quickly and very reliably.

In an advantageous embodiment of the present invention, a setting of the camera apparatus is adapted as a function of the ascertained suitable illumination signal. An image acquisition rate of the camera apparatus is preferably adapted to a flashing characteristic or flashing frequency of the ascertained suitable illumination signal. The second acquisition of the current camera image, or the second sequence of second camera images, of the environment of the vehicle is then accomplished by way of the camera apparatus as a function of the adapted setting or with an adapted setting. The advantage resulting therefrom is that image artifacts acquired in the first camera image and/or in the first sequence of first camera images are reduced or avoided in the second camera image or in the second sequence of second camera images; for example, flickering artifacts are avoided in the second sequence of second camera images.

In a refinement of the present invention, provision can be made that in a further step of the present invention, the distance between the vehicle and the inductive charging station is detected or ascertained by way of a distance sensor. The distance sensor is, for example, at least one ultrasonic sensor, radar sensor, and/or lidar sensor, and/or a WLAN transmission and reception apparatus having several antennas, which is configured to determine a distance or a position of the vehicle with respect to the inductive charging station. The suitable illumination signal is then additionally determined as a function of the detected or ascertained distance. The advantage resulting therefrom is that the method can be adapted to the distance of the vehicle with respect to the inductive charging station; for example, advantageously, the brightness of the suitable illumination signal can be ascertained or adapted as a function of the distance. Acceptance of the method by the user and/or by other traffic participants is thereby enhanced.

The present invention also relates to a control device for a vehicle, the control device being configured to carry out the method according to the present invention for positioning a vehicle. The control device is configured in particular to acquire data or electrical signals from a camera apparatus which represent a current first and/or second camera image or a first and/or second sequence of first or second camera images. The control device is furthermore advantageously configured to transmit a control signal to an inductive charging station in an environment of the vehicle by way of a transmission apparatus, as a function of data acquired by the camera apparatus and representing the first camera image or the first sequence of first camera images; advantageously, the transmission occurs by way of a radio connection. The control signal represents at least one illumination signal, in particular one easily recognizable by the control device in a current camera image, for an illumination means of a reference element. The control device is furthermore advantageously configured to generate, as a function of the data of the camera apparatus representing the second camera image or the second sequence of second camera images, at least one control variable for automatic control of a vehicle in a longitudinal and/or transverse direction.

The present invention further relates to a vehicle having a control device according to the present invention.

The present invention further relates to a method for controlling an inductive charging station. The method encompasses reception of a control signal from a vehicle, the control signal representing a suitable illumination signal for an illumination means (device) of a reference element of the inductive charging station. The control signal is received in particular by way of a receiving means as a radio signal. At least one parameter of a light or illumination signal of the illumination means which has been emitted is then adapted as a function of the received control signal. In particular, a position of the reference element on the inductive charging station and/or a brightness of the illumination means and/or a color or an emission spectrum of the illumination means and/or a flashing characteristic of the illumination means, in particular a flashing frequency, and/or a polarization of the emitted light of the illumination means, is modified as a parameter. Thanks to the method, the at least one reference element of the inductive charging station can easily be recognized in a camera image acquired by way of a camera apparatus or an acquired sequence of camera images, so that a relative position and/or an orientation between an approaching vehicle and the inductive charging station can be determined relatively easily by a vehicle for automatic and aligned positioning of the vehicle at the inductive charging station. Advantageously, the method for controlling the inductive charging station can be carried out repeatedly or continuously.

In an example embodiment of the method for controlling the inductive charging station according to the present invention, provision can be made that the illumination means of the reference element of the inductive charging station is switched on as a function of the received control signal; in particular, the illumination means is switched on only after the control signal is received. Advantageously, the illumination means is switched on as a function of the received control signal. The illumination means then preferably emits the suitable illumination signal. Energy for operating the inductive charging station is thereby saved, and the general acceptance of the inductive charging station and of the method for, in particular automatic, positioning of a vehicle is enhanced.

In a further aspect, the present invention relates to a control device for an inductive charging station. The control device for the inductive charging station is configured to carry out the method according to the present invention for controlling the inductive charging station.

The present invention further relates to an inductive charging station having at least one reference element having an illumination means. The inductive charging station is configured to adapt a light signal or illumination signal, emitted by way of the illumination means of the reference element, as a function of a received control signal. The inductive charging station furthermore encompasses a control device according to the present invention for an inductive charging station.

Further advantages are evident from the description below of exemplifying embodiments with reference to the Figures.

BRIEF DESCRIPTION OF THE DRAWINGS

FIG. 4 is a flow chart, as a block diagram, of a method for controlling an inductive charging station, in accordance with an example embodiment of the present invention.

DETAILED DESCRIPTION OF EXAMPLE EMBODIMENTS

Figure 1:
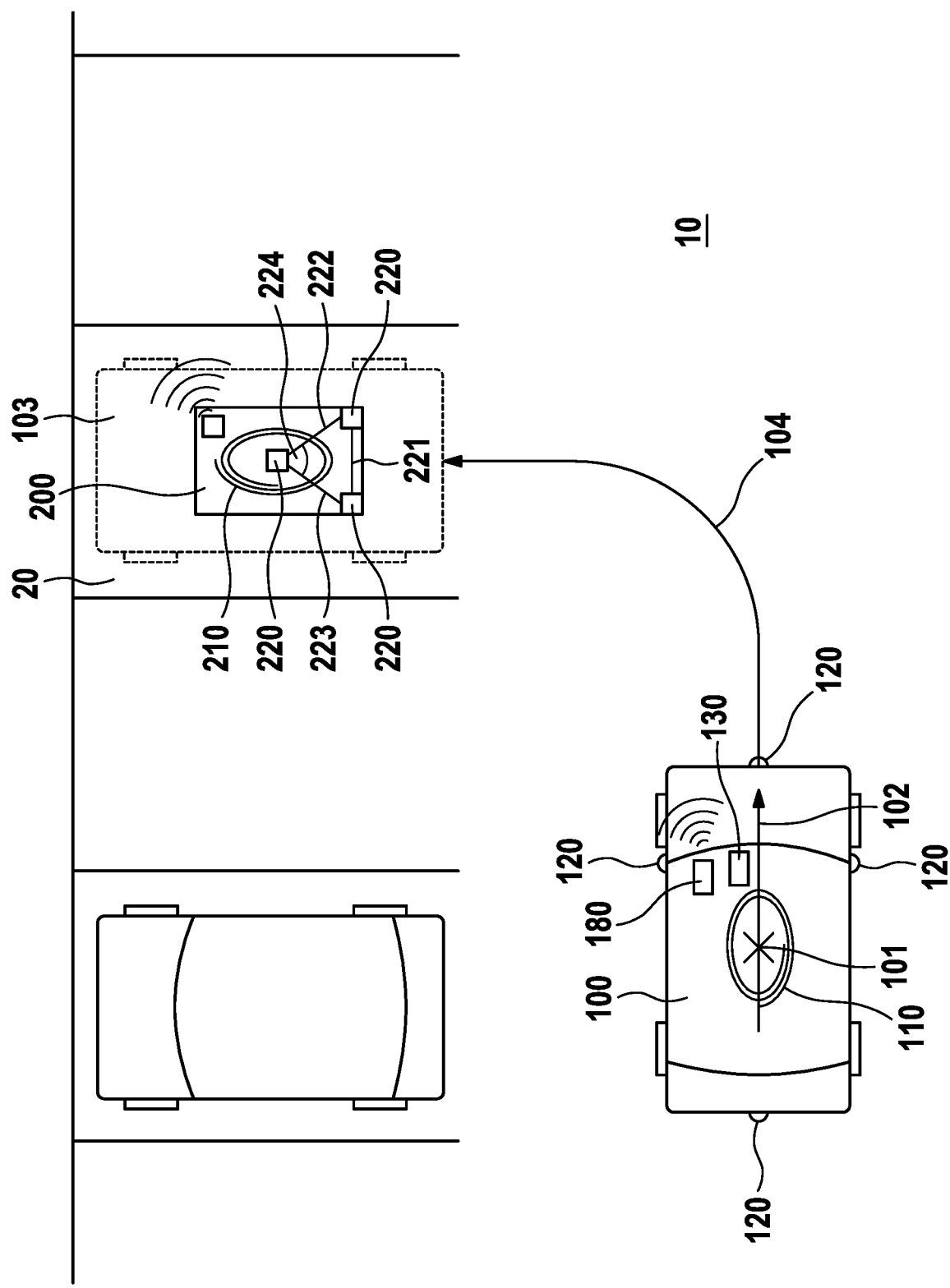
FIG. 1 is a view of a vehicle approaching an inductive charging station in accordance with an example embodiment of the present invention.

FIG. 1 is a schematic plan view, or view from above, of a vehicle 100 having an inductive charging coil 110 approaching an inductive charging station 200. Inductive charging station 200 is disposed, for example, in or on the substrate of a road surface of a parking space, so that a vehicle 100 having an inductive charging coil 110, which is advantageously disposed on the bottom of vehicle 100, can be parked or positioned over or above the inductive charging station. In FIG. 1, vehicle 100 is at a first position 101 and has an alignment or orientation 102 in a travel direction of the vehicle. Both position 101 and alignment 102 are intended to be modified for efficient inductive energy transfer between vehicle 100 and charging station 200, the vehicle being guided automatically, along a trajectory 104 that is to be determined, into an energy-efficient parked position 103 depicted with dashed lines in FIG. 1. This parked position 103 is to be arrived at as accurately as possible, since the efficiency of the inductive energy transfer is thereby increased. A camera or camera apparatus 120 of vehicle 100 is configured to acquire a camera image, or a sequence of camera images, of environment 10 of vehicle 100. Camera apparatus 120 can have an alignment or viewing direction toward the front in a travel direction, toward the rear, and/or to the right and/or to the left side of the vehicle. Camera apparatus 120 encompasses, for example, a front camera. Camera apparatus 120 of vehicle 100 preferably encompasses a wide-angle camera on each side, i.e., four cameras, so that the front, rear, right, and left environmental regions around vehicle 100 are imaged. In addition, vehicle 100 can have at least one optional distance sensor, for example a monoscopic camera, a stereo camera, a lidar, radar, and/or ultrasonic sensors, for detecting a distance between objects, for example between inductive charging station 200 and vehicle 100. The vehicle further encompasses a radio device 180 of vehicle 100, said radio device 180 being configured to transmit a radio signal, in particular a control signal, to the inductive charging station. Radio signals or radio connections for purposes of this invention are, for example, a WLAN connection, a Bluetooth connection, an infrared connection, or a mobile radio connection. In other words, the vehicle is configured to communicate, or to exchange data, via radio with the inductive charging station. This exchange can optionally occur via or by way of a server apparatus. A control device 130 of vehicle 100 is configured to ascertain, on the basis of at least two reference elements 220, recognized in at least one camera image, of inductive charging station 200 in the second camera image or in the second sequence of second camera images, and based on a known or detected disposition of reference elements 220, the relative position 101 of vehicle 100 and/or the orientation or alignment 102 of vehicle 100 with respect to inductive charging station 200. This relative position 101 and/or orientation 102 of vehicle 100 is highly accurate, so that on the basis thereof the vehicle can be automatically positioned highly accurately on the inductive charging station. The known or detected disposition of reference elements 220 encompasses in particular distances 221, 222, and 223 between reference elements 220 on inductive charging station 200, and/or the angular relationships or angles 224 between the straight lines connecting reference elements 220. Alternatively or additionally, the disposition of reference elements 220 can be transmitted by radio from inductive charging station 200 to vehicle 100, and received by vehicle 100.

Figure 2:
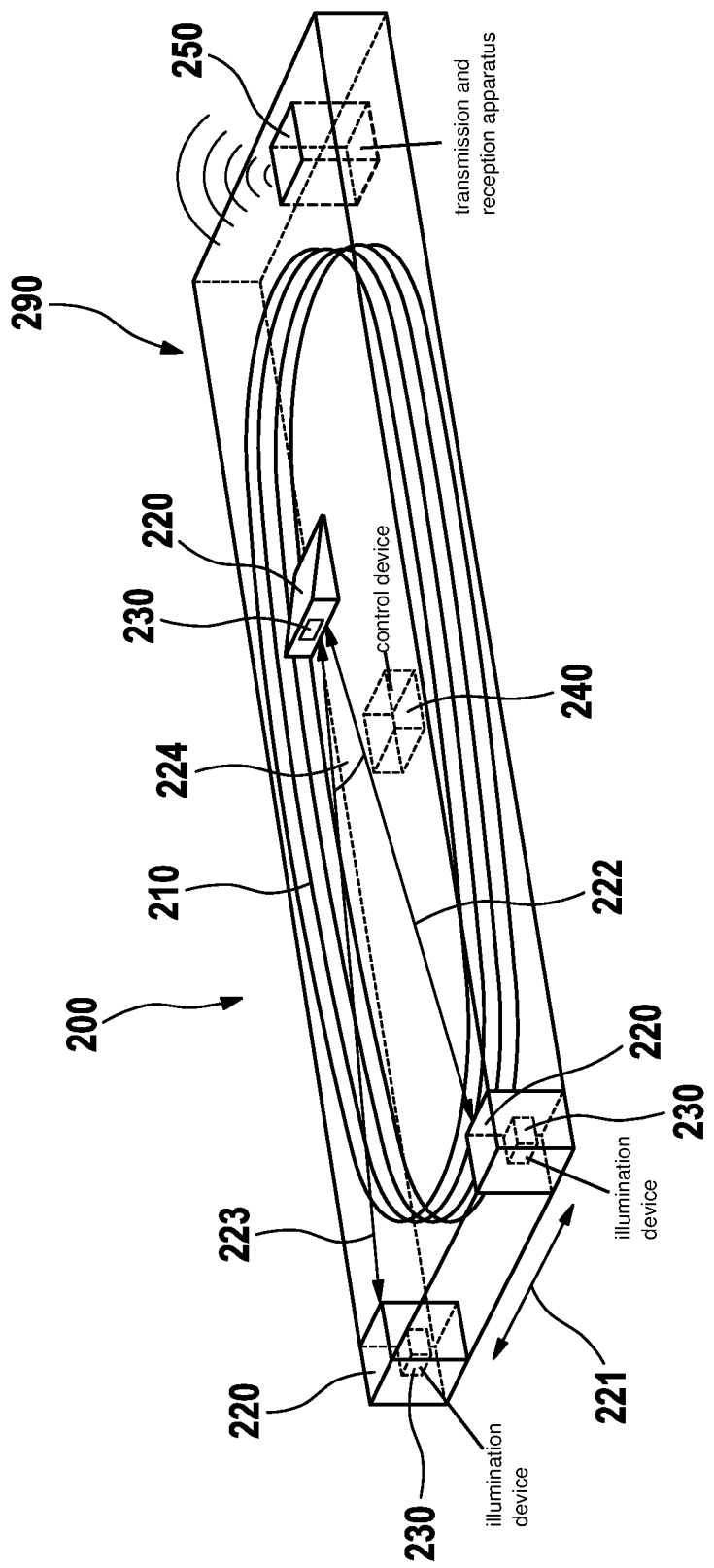
FIG. 2 shows an inductive charging station having reference elements in accordance with an example embodiment of the present invention.

FIG. 2 depicts, in a three-dimensional side view, an inductive charging station 200 on a substrate 290 of a road surface, in particular of a parking space. Inductive charging station 200 encompasses an, in particular stationary, coil 210 for energy transfer. Inductive charging station 200 furthermore has, in this example, three reference elements 220. Each reference element 220 encompasses at least one illumination means 230; illumination means 230 is preferably a light-emitting diode. Reference element 220 can encompass further optional components, for example a non-switchable or switchable mirror, at least one non-switchable or switchable color filter, and/or at least one non-switchable or switchable polarizing filter. Reference elements 220 are configured to emit an illumination signal by way of illumination means 230. A control device 240 of inductive charging station 200 is configured to switch on illumination means 230 or reference element 220 in order to emit an illumination signal, and/or to adapt an emitted illumination signal of illumination means 230 or of reference element 220. Control device 240 of inductive charging station 200 can furthermore be configured to apply control to the further optional components, for example to the mirror and/or to switchable color filters and/or to switchable polarizing filters. Inductive charging station 200 or control device 240 of inductive charging station 200 is furthermore configured to generate an illumination signal as a function of a control signal received from vehicle 100, the control signal representing in particular a suitable illumination signal. Inductive charging station 200 has a transmission and reception apparatus 250 for reception of the control signal. Transmission and reception apparatus 250 is configured to establish a radio connection between vehicle 100 and inductive charging station 200, or to receive a radio signal from vehicle 100. Reference elements 220 or their positions exhibit a variable or fixed distance 221, 222, and 223 and, for example, an angle 224 with respect to one another; vehicle 100 knows, or can detect visually or by radio, the positions or disposition of reference elements 220 on inductive charging station 200; in particular, distances 221, 222, and/or 223 of reference elements 220 with respect to one another, and/or the angular relationships or, for example, angle 224 between two or all of reference elements 220 are known or are detected visually or by radio. Inductive charging station 200 can be configured, for example, to transmit to vehicle 100, in particular via a radio connection, the disposition of reference elements 220 with respect to one another. Inductive charging station 200 can furthermore be configured, for example, to visually display the disposition of reference elements 220 with respect to one another on a display of inductive charging station 200 or by way of a data matrix code that is disposed on an external surface of inductive charging station 200.

Figure 3:
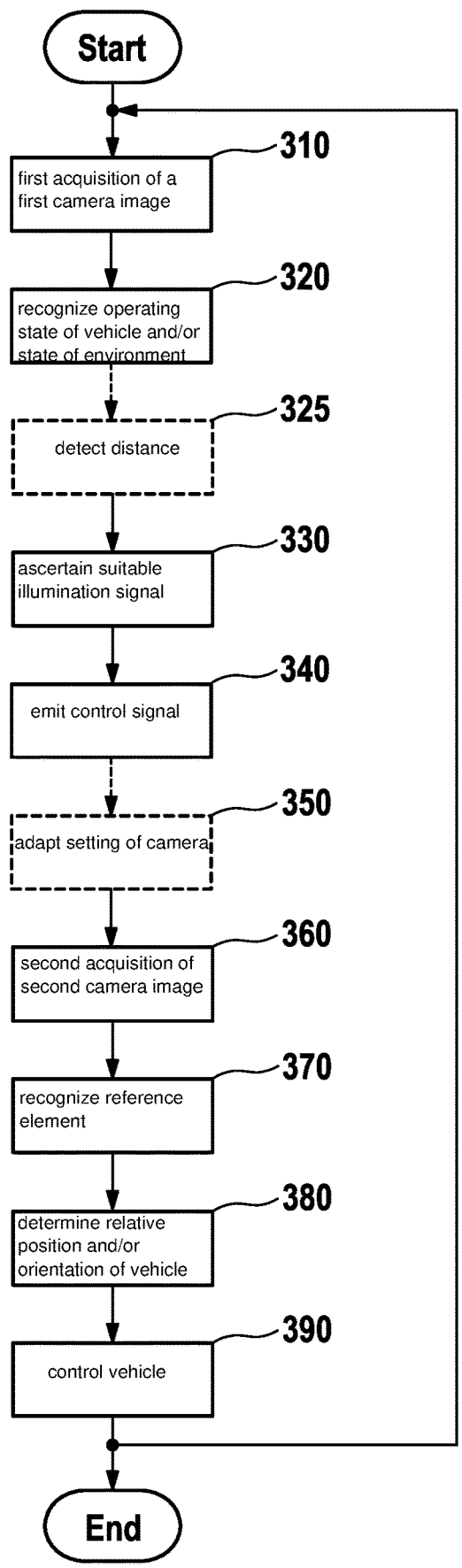
FIG. 3 is a flow chart, as a block diagram, of a method for positioning a vehicle, in accordance with an example embodiment of the present invention.

FIG. 3 depicts, as a block diagram, a flow chart of a method for positioning a vehicle, having an inductive charging coil, on a stationary inductive charging station, this method being carried out in particular by way of the vehicle. The method encompasses a first acquisition 210 of a current first camera image of an environment of the vehicle by way of a camera apparatus on the vehicle. Then, in step 320, at least one operating state of the vehicle and/or one state of the environment of the vehicle is recognized as a function of the acquired first camera image. Optionally, provision can be made to detect or ascertain in step 325 a distance between the vehicle and the inductive charging station by way of a distance sensor and/or by way of a satellite-based localization sensor. In a further step 330, a suitable illumination signal for at least one illumination means of a reference element of the inductive charging station is ascertained as a function of the recognized operating state or environmental state. The suitable illumination signal is ascertained 330 by selection of a position of the reference element on the inductive charging station and/or a brightness of the illumination means and/or a color of the illumination means and/or a flashing characteristic of the illumination means and/or a polarization of the light to be emitted by the illumination means. Optionally, the ascertainment 330 of the suitable illumination signal is effected additionally as a function of the detected distance. A control signal is then emitted 340 to the inductive charging station as a function of the ascertained suitable illumination signal. In an optional step 350, a setting of the camera apparatus is adapted as a function of the ascertained suitable illumination signal; in particular, an image acquisition rate is adapted to a flashing frequency ascertained as a suitable illumination signal. Advantageously, ascertainment 330 of the suitable illumination signal, emission 340 of the control signal, and optionally adaptation 350 of the setting of the camera apparatus, are carried out repeatedly or continuously. A second acquisition 360 of a further current second camera image of the environment of the vehicle is then carried out by way of the camera apparatus on the vehicle. Second acquisition 360 of the current second camera image is optionally effected additionally as a function of the adapted setting. The at least one reference element is recognized 370 as a function of the acquired second camera image and the ascertained suitable illumination signal. In step 380, a relative position and/or an orientation of the vehicle with respect to the inductive charging station is determined as a function of the recognized reference element in the second camera image. Determination 380 of the relative position and/or the orientation of the vehicle with respect to the inductive charging station is effected in particular additionally as a function of the disposition—known, received by radio, and/or visually detected—of reference elements 220 on the inductive charging station, or as a function of distances 221, 222, 223 between reference elements 220. In step 390, vehicle 100 is controlled in a longitudinal and/or transverse direction as a function of the determined relative position and/or of the orientation of the vehicle with respect to the inductive charging station, control 390 being effected in particular along a trajectory, determined as a function of the ascertained relative position and/or of the orientation of the vehicle, between vehicle 100 and inductive charging station 200. The method for positioning the vehicle, having the inductive charging coil, on the stationary inductive charging station can be carried out once, repeatedly, or continuously.

FIG. 4 depicts, as a block diagram, a flow chart of a method for controlling an inductive charging station 200 in accordance with an example embodiment of the present invention, the method being carried out in particular by way of the inductive charging station. The method encompasses reception 410 of a control signal from a vehicle 100, the control signal representing a suitable illumination signal for an illumination means of a reference element of the inductive charging station. In an optional step 420 of the method for controlling the inductive charging station, the illumination means of the reference element of the inductive charging station is switched on as a function of the received control signal. Then, in step 430, at least one parameter of an emitted light or of an illumination signal of the illumination means of the reference element of the inductive charging station is adapted or modified as a function of the received control signal. The light that is emitted or to be emitted, or the illumination signal, of the illumination means encompasses as a parameter a position of the reference element on the inductive charging station and/or a brightness of the illumination means and/or a color of the illumination means and/or a flashing characteristic of the illumination means, in particular a flashing frequency, and a polarization of the emitted light of the illumination means. The method for controlling inductive charging station 200 can be carried out once, repeatedly, or continuously.

What is claimed is:

1. A method for positioning a vehicle having an inductive charging coil, at a stationary inductive charging station, comprising the following steps:
    performing a first acquisition of a first camera image of an environment of the vehicle using a camera apparatus on the vehicle;
    recognizing an operating state of the vehicle, and/or a state of the environment of the vehicle, as a function of the acquired first camera image;
    ascertaining a suitable illumination signal for at least one illumination device of a reference element of the inductive charging station as a function of the recognized operating state or environmental state, by selecting a parameter for the suitable illumination signal;
    emitting a control signal to the inductive charging station as a function of the ascertained suitable illumination signal;
    performing a second acquisition of a second camera image of the environment of the vehicle using the camera apparatus;
    recognizing the reference element as a function of the acquired second camera image and of the ascertained suitable illumination signal;
    determining a relative position and/or an orientation of the vehicle with respect to the inductive charging station as a function of the recognized reference element in the second camera image; and
    controlling the vehicle in a longitudinal and/or transverse direction as a function of the determined relative position and/or of the orientation of the vehicle with respect to the inductive charging station.

2. The method as recited in claim 1, wherein the suitable illumination signal includes the following parameters:
    a position of the reference element on the inductive charging station; and/or
    a brightness of the illumination device; and/or
    a color of the illumination device; and/or
    a flashing characteristic of the illumination device; and/or
    a polarization of light of the illumination device which is to be emitted.

3. The method as recited in claim 1, further comprising the following:
    adapting of a setting of the camera apparatus as a function of the ascertained suitable illumination signal, including adapting an image acquisition rate to a flashing frequency;
    wherein the second acquiring of the second camera image using the camera apparatus is additionally as a function of the adapted setting.

4. The method as recited in claim 1, further comprising the following:
    detecting, using a distance sensor, a distance between the vehicle and the inductive charging station;
    wherein the ascertainment of the suitable illumination signal is additionally as a function of the detected distance.

5. A control device for a vehicle for positioning the vehicle having an inductive charging coil, at a stationary inductive charging station, the control device configured to:
    perform a first acquisition of a first camera image of an environment of the vehicle using a camera apparatus on the vehicle;
    recognize an operating state of the vehicle, and/or a state of the environment of the vehicle, as a function of the acquired first camera image;
    ascertain a suitable illumination signal for at least one illumination device of a reference element of the inductive charging station as a function of the recognized operating state or environmental state, by selecting a parameter for the suitable illumination signal;
    emit a control signal to the inductive charging station as a function of the ascertained suitable illumination signal;
    perform a second acquisition of a second camera image of the environment of the vehicle using the camera apparatus;
    recognize the reference element as a function of the acquired second camera image and of the ascertained suitable illumination signal;
    determine a relative position and/or an orientation of the vehicle with respect to the inductive charging station as a function of the recognized reference element in the second camera image; and
    control the vehicle in a longitudinal and/or transverse direction as a function of the determined relative position and/or of the orientation of the vehicle with respect to the inductive charging station.

6. A vehicle, comprising:
    an inductive charging coil; and
    a control device for positioning the vehicle at a stationary inductive charging station, the control device configured to:
    perform a first acquisition of a first camera image of an environment of the vehicle using a camera apparatus on the vehicle,
    recognize an operating state of the vehicle, and/or a state of the environment of the vehicle, as a function of the acquired first camera image,
    ascertain a suitable illumination signal for at least one illumination device of a reference element of the inductive charging station as a function of the recognized operating state or environmental state, by selecting a parameter for the suitable illumination signal,
    emit a control signal to the inductive charging station as a function of the ascertained suitable illumination signal,
    perform a second acquisition of a second camera image of the environment of the vehicle using the camera apparatus,
    recognize the reference element as a function of the acquired second camera image and of the ascertained suitable illumination signal,
    determine a relative position and/or an orientation of the vehicle with respect to the inductive charging station as a function of the recognized reference element in the second camera image, and control the vehicle in a longitudinal and/or transverse direction as a function of the determined relative position and/or of the orientation of the vehicle with respect to the inductive charging station.

7. A method for controlling an inductive charging station having a reference element including an illumination device, the method comprising the following steps:

receiving a control signal from a vehicle, the control signal representing a suitable illumination signal for the illumination device; and adapting at least one parameter of an illumination signal of the illumination device as a function of the received control signal, wherein at least one of the following is modified as a function of the adapting:
i. a position of the reference element on the inductive charging station; and/or
ii. a brightness of the illumination device; and/or
iii. a color of the illumination device; and/or
iv. a flashing characteristic of the illumination device including a flashing frequency; and/or
v. a polarization of emitted light of the illumination device.

8. The method as recited in claim 7, further comprising: switching on the illumination device of the reference element as a function of the received control signal.

9. A control device configured to control an inductive charging station having a reference element including an illumination device, the control device configured to:

receive a control signal from a vehicle, the control signal representing a suitable illumination signal for the illumination device; and adapt at least one parameter of an illumination signal of the illumination device as a function of the received control signal, wherein the control device is configured to modify at least one of the following as a function of the adaptation:
i. a position of the reference element on the inductive charging station; and/or
ii. a brightness of the illumination device; and/or
iii. a color of the illumination device; and/or
iv. a flashing characteristic of the illumination device including a flashing frequency; and/or
v. a polarization of emitted light of the illumination device.

10. An inductive charging station, comprising:

at least one reference element having an illumination device, the inductive charging station being configured to adapt an illumination signal emitted using the illumination device; and a control device configured to control the inductive charging, the control device configured to:

receive a control signal from a vehicle, the control signal representing a suitable illumination signal for the illumination device; and adapt at least one parameter of an illumination signal of the illumination device as a function of the received control signal, wherein the control device is configured to modify at least one of the following as a function of the adaptation:
i. a position of the reference element on the inductive charging station; and/or
ii. a brightness of the illumination device; and/or
iii. a color of the illumination device; and/or
iv. a flashing characteristic of the illumination device including a flashing frequency; and/or
v. a polarization of emitted light of the illumination device.

* * * * *